United States Patent [19]

Rice

[11] Patent Number: 4,728,223

[45] Date of Patent: Mar. 1, 1988

[54] METHODS OF RENOVATING SEWERS

[75] Inventor: Nigel L. Rice, Nr. Doncaster, England

[73] Assignee: Pirelli Construction Co. Ltd., London, England

[21] Appl. No.: 554,784

[22] Filed: Nov. 23, 1983

[30] Foreign Application Priority Data

Nov. 24, 1982 [GB] United Kingdom ............... 8233618

[51] Int. Cl.⁴ .............................................. E03F 3/06
[52] U.S. Cl. .................................... 405/154; 138/97; 405/156
[58] Field of Search ............... 405/154, 184, 150, 156; 138/97, 140, 149, 155

[56] References Cited

U.S. PATENT DOCUMENTS 2,794,758 6/1957 Harper et al. ............... 405/154 X
3,602,263 8/1971 Bremner ........................ 405/154 X

FOREIGN PATENT DOCUMENTS 26191 10/1983 European Pat. Off. .
WO80/02124 10/1980 World Int. Prop. O. .
WO82/04086 11/1982 World Int. Prop. O. .
2041147 9/1980 United Kingdom .
2079805 1/1982 United Kingdom .

Primary Examiner—David H. Corbin
Attorney, Agent, or Firm—Bert J. Lewen; Henry Sternberg

[57] ABSTRACT

This invention relates to an improved method of relining a sewer especially a small diameter sewer with a plurality of lengths of pipe.

From a control station remote from the sewer, pipes are moved up the sewer to the fixed lining. The pipe is then inductively fusion welded to the lining and the annulus between the pipe and the sewer is sealed with grout. All these operations are controlled from the control station.

Also provided by the invention is a method of accurately locating laterals in the sewer and cutting holes in the pipe and accurately aligning these holes with the lateral to accommodate the lateral.

Also provided is a grouting pump for forming grout in situ in the sewer.

12 Claims, 7 Drawing Figures

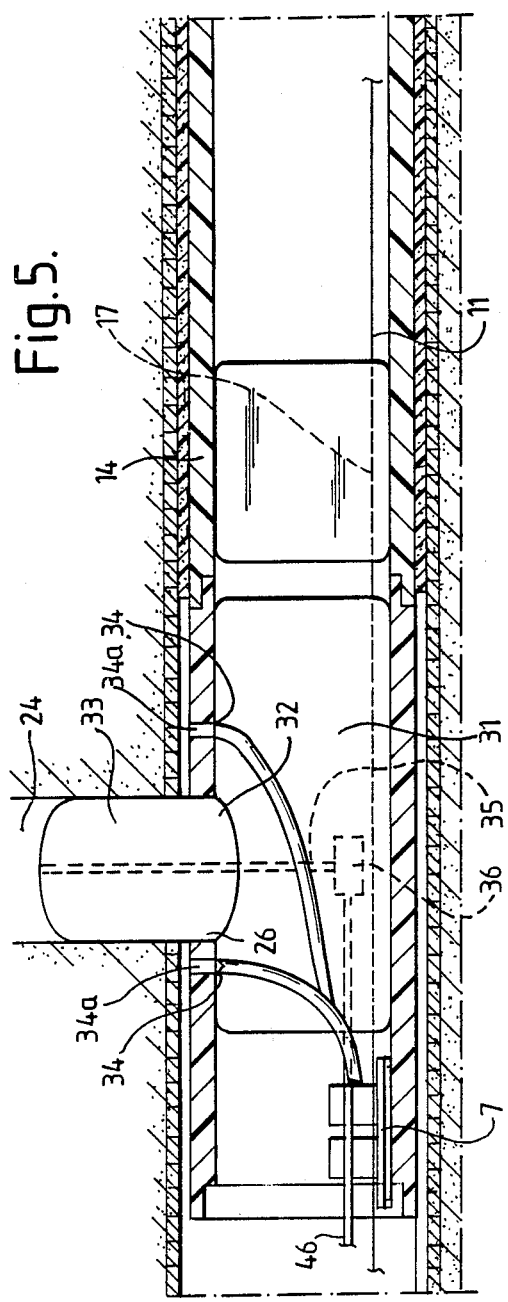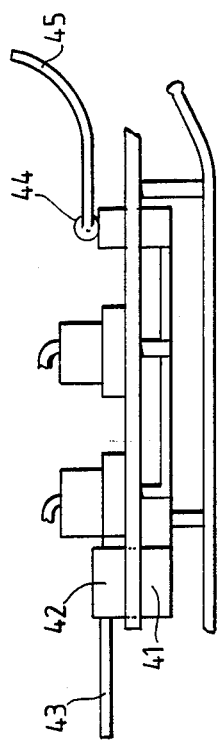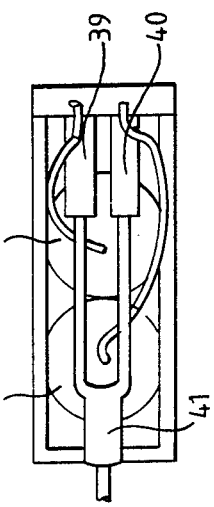

METHODS OF RENOVATING SEWERS

This invention relates to an improved method of renovating sewers, in particular by relining the sewer with small lengths of plastic pipe.

Ninety-five per cent of Britain's sewers are non-man entry sewers. Many of these were built during the Industrial Revolution and so by now are beginning to collapse. This problem is also occurring in most other industrialized countries. Thus it is becoming increasingly important to find efficient and cost effective methods for either replacing or renovating these old sewers.

The main problem is that many of these sewers lie under busy roads, may lie deep under ground may even have been built over. This means that in many cases it is not feasible to replace the sewer, apart from the fact that this involves a greater cost. Also any method of renovating a sewer must involve the minimum of excavation.

Various methods are now in use for renovating sewers by relining the sewer. One of the major problems met in these methods is that many sewers have conduits joining them. Such conduits are known as laterals. Clearly any lining of the sewer will have to have a hole in it at the position of every lateral so that the connection between the lateral and the main sewer is not blocked.

A method of overcoming this problem is to put the hole cutting means down the lateral and to cut a hole from outside the sewer. The main problem with this method is that for it to be successful the location of the top of the laterals, that is, the man-hole where they reach the ground, must be both known and easily accessible. In many cases these positions are not known and the man-hole may even have been built over.

Another method of accommodating laterals which has been proposed is to find the location of the laterals with respect to the end of the sewer and then to cut the appropriate holes in the lining before placing the lining in the sewer. The major problem involved in this is that it is difficult to find the exact location of each lateral and any variation in temperature along the sewer can cause expansion of the lining which means that the holes cut in the sewer lining may not be aligned with the lateral. Any error in the positioning of the holes in the lining can be disastrous since it can cause the blocking of the laterals and can often only be solved by complete excavation of the sewer.

A method of relining sewers which is now being developed is to reline a sewer by taking small lengths of pipe up a sewer separately and building up the sewer lining section by section so that any mistakes will not involve the digging up of the whole sewer. Another advantage of this method is that a small section of pipe can go over any obstructions in a sewer with much more ease that if the sewer was to be lined with only one length of pipe.

According to this invention a method of lining a sewer comprises passing a first length of pipe along the sewer from the control station to a predetermined starting position within the sewer to form a first length of lining, and subsequently repeating the steps of passing a further length of pipe along the sewer from the control station to a joint position wherein the further length pipe abuts the sewer lining, and forming a permanent joint between the further length of pipe to the lining to extend the sewer lining, wherein all the steps are controlled from the control station.

A method commonly used for taking the separate pieces of pipe up the sewer is to insert an inflatable bag in its deflated state into the pipe, and then to inflate the bag to give a tight fit. The inflatable bag has means to attach to a winch to pull the pipe along the sewer. When the pipe is in place the bag is deflated and returned to the working end of the sewer.

Preferably the lining pipes are thermoplastic and the joints are effected by induction fusion welding.

The method of inductively welding the pipes together is based on European patent application No. 809006026 in which an inductive coil is used to induce a current in an electrically conductive material which melts the thermoplastic pipes to weld them together. In this case it is preferred that the pipes have a spigot at one end and a socket at the other, the socket carrying on its inside surface a strip of electrically conductive material. The inflatable bag preferably carries an inductive coil. The inflatable bag is positioned so that the coil is located within the spigot end of the pipe. When the spigot of the pipe pulled up the sewer is in place within the socket of the last pipe fixed in the sewer then the inductive coil and the electrically conductive material are aligned with each other and inductive welding may take place.

It is preferred that current passes through the inductive coil all the time when the pipe is being put up the sewer and a meter measures the voltage across the induction coil. This may then be used to accurately locate the pipe into the last piece of pipe. When the piece of pipe is in position there will be a deflection on the voltage meter showing that the pipe is in place and can now be inductively welded to the last pipe. This ensures that the pipe is in its required position and no gaps are left between the pipes.

Preferably after the joint between the further length of pipe and the lining has been effected, the annular space between the further length of pipe and the sewer is filled with grout, the grouting being effected and controlled at the control station.

Preferably the grouting is carried out by a grouting pump which is small and may be carried up the sewer within the pipe. Each pipe includes a tiny hole having connected to it a nipple which has a weakened portion. Before a pipe is placed within the sewer the grouting pump is placed within the pipe with a tube leading from it to the nipple. When the grouting has been completed the grouting pump is pulled, the weakened portion of the nipple breaks and the grouting pump may then be removed from the sewer.

The location of the position of the lateral has to be exact and accurate. Preferably the cable which pulls the pieces of pipe up the sewer includes a thin metal rod along part of its length. To fix a reference point on the last pipe an inflatable bag is used which has a hole of slightly larger diameter than the metal rod extending along its length on a point close to its edge. A cage which has a similar hole is attached to it by inserting a metal rod through both the hole on the cage and the hole on the inflatable bag. The cage carries a close-circuit T.V. camera which is movable from one end of the cage to the other end of the cage. It also includes a rotatable mirror which means that the camera may scan all around the sewer. Graduations along the cage show the longitudinal position of the camera and a graduated scale extending around the cage shows the radial position of the rotatable mirror. This bag and cage are pulled up the sewer until the bag is located within the last pipe. The cage is of a slightly larger size than the inside of the pipe and so will not pass into the last pipe. When the cage is in position the bag is inflated to form a fixed reference point which is the end of the hole through which the metal rod is placed.

The T.V. camera is then moved along the cage, the T.V. signals being sent to a viewer outside the sewer. When the viewer shows that the camera has located the edge of a lateral the mirror is rotated around until the camera notes the longitudinal position of the start of the lateral. The opposite edge of the lateral is found in a similar way. The radial position of the lateral with respect to the fixed point of the metal rod is then found.

The cage is then removed from the sewer leaving the inflatable bag in position in the last pipe. A similar inflatable bag with a hole along the length of its circumference is placed within another piece of pipe and a hole is cut in the pipe at the correct longitudinal and radial position with respect to the hole in the bag using the data collected by the T.V. camera.

Another T.V. camera is placed in this cut pipe facing out of the hole. The pipe is then carried up the sewer. When the cut pipe comes close to the last pipe the metal rod will enter the hole in the bag and bring the pipe into the correct radial position with respect to the fixed point. The T.V. camera checks that the hole is correctly aligned with the lateral.

The bag inside the cut pipe is then deflated and removed from the sewer, also bringing the T.V. camera out of the sewer.

Preferably when the cut pipe has been welded to the lining the annulus around the pipe is grouted by, passing an auxiliary grouting bag along the sewer to a position within the cut pipe, the auxiliary grouting bag comprising a first flexible cylindrical bag having a hole in its side which is fixed a flexible shuttering bag, the shuttering bag being capable of being in two positions, a first position wherein the shuttering bag is totally enclosed within the cylinder, the cylindrical bag being placed within the cut pipe with the hole of the bag and the pipe generally aligned, pressure being applied from the control station to the shuttering bag to inflate the shuttering bag from its first position to its second position where it protrudes out of the cylinder into the lateral whereby the lateral is completely sealed off so that the annulus between the cut pipe and sewer may be grouted. The cut price includes two nipples, the flexible bag having outlets in a corresponding position which are connected to the grouting pump. When the bag is in position in the cut pipe the holes and the nipples are aligned. The flexible bag is prevented from rotation by the weight of the connection to the pump.

Preferably the shuttering bag has a string attached to it and the auxiliary grouting pipe includes a photocell so that when the shuttering bag is completely inflated up the lateral the string is moved and the photocell senses that the bag is in position.

The method of locating a lateral, cutting a hole in the correct position and grouting around the cut pipe is very efficient since there are checks involved along the way at each step in the process. This avoids any errors and any danger of having to dig up the sewer.

According to a further aspect of the invention, a grouting pump for mixing grout from at least two components in situ comprising at least two containers each container holding one of the two components, each container being coupled to a measuring means to measure a required quantity of the component, the measuring means delivering a measured quantity of each component to a mixing and delivering nozzle which mixes the components and feeds the grout out of the pump, and control means coupled to the measuring means and the mixing nozzle to control the operation of the pump.

Preferably the measuring means is in the form of pistons which measure a fixed quantity of each component and feed this measured quantity of component to the mixing nozzle. The mixing nozzle spins the components together to mix them thoroughly.

Preferably the pump is controlled by air logic so that the pump may be used under water.

Also within the scope of the present invention is any novel part of the above method.

Preferably the pump runs from an air logic system which means that no power has to be applied to the pump so that the pump may be used under water safely.

The preferred method according to this invention is very efficient and cost effective since no excavation is required, since the pipes may be entered into the sewer via an existing man-hole. This means that if a sewer is under a busy road the road does not have to be closed. Since at each step in the method there is some check that the pipes are in the correct position there is little likelihood of error occurring resulting in the sewer having to be totally dug up. Also since the grouting pump used is run by an air logic system the sewer may be relined and renovated while still running which avoids any disruption of local amenities.

A cut pipe has more strength if the hole which is cut in it is near the center of the pipe. Thus it is preferred that the length of the last pipe before the lateral may be varied so that the position of the lateral is around the middle of the pipe to be cut. Since it is possible to have laterals of different diameters it is preferred that auxiliary grouting pipes with holes of different diameters may be used.

An example of a method of relining a pipe in accordance with the present invention will now be described with reference to the accompanying drawings, in which:

FIG. 5 is a schematic side view of a sewer with an auxiliary grouting bag in position with the shuttering bag inflated up the lateral;

FIG. 6 is a view of the underneath of a grouting pump in accordance with the invention; and, FIG. 7 is a side view of the grouting pump of FIG. 6.

Figure 1:
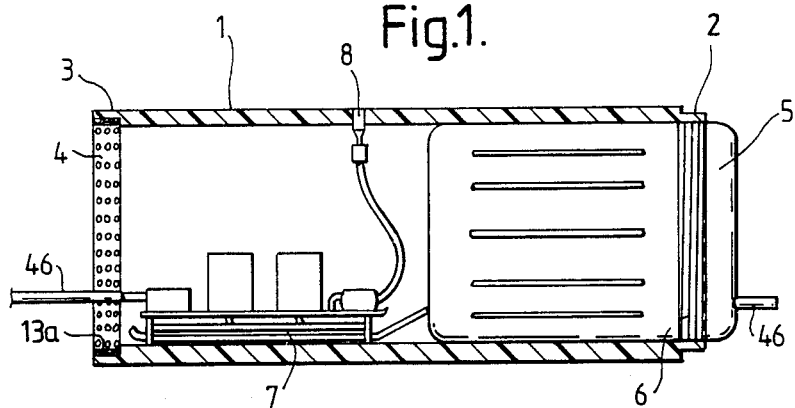
FIG. 1 is a schematic side view of a piece of pipe with the inflatable bag and the grouting pump in position within the pipe with half of the pipe cut away.
Figure 2:
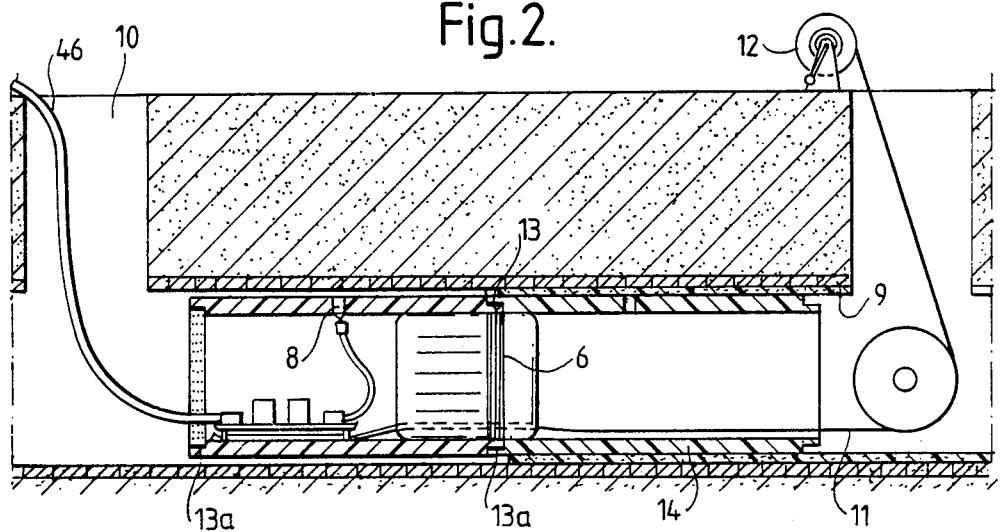
FIG. 2 is a schematic side view of a sewer showing two pipes in position.
Figure 3:
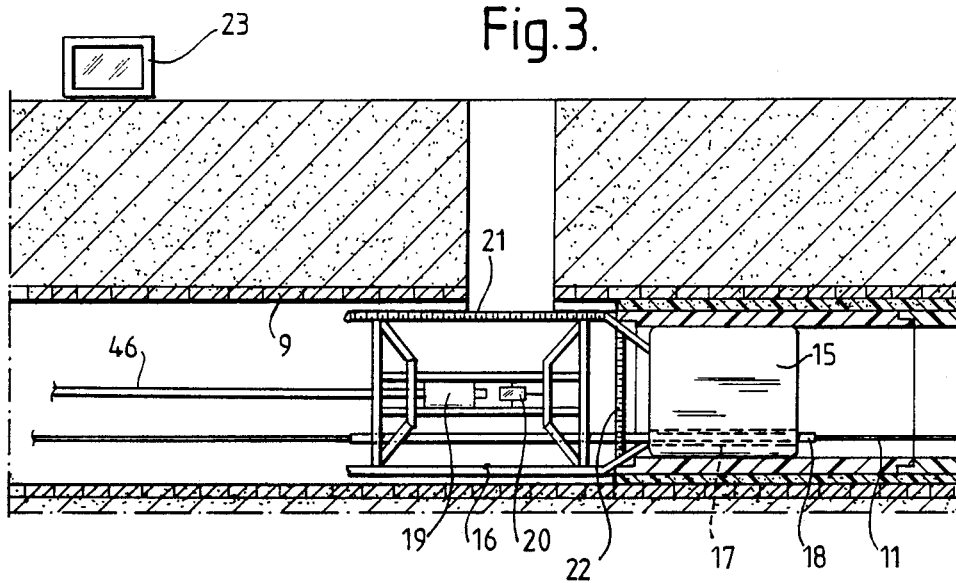
FIG. 3 is a schematic side view of a sewer with a cage in position adjacent a lateral.
Figure 4:
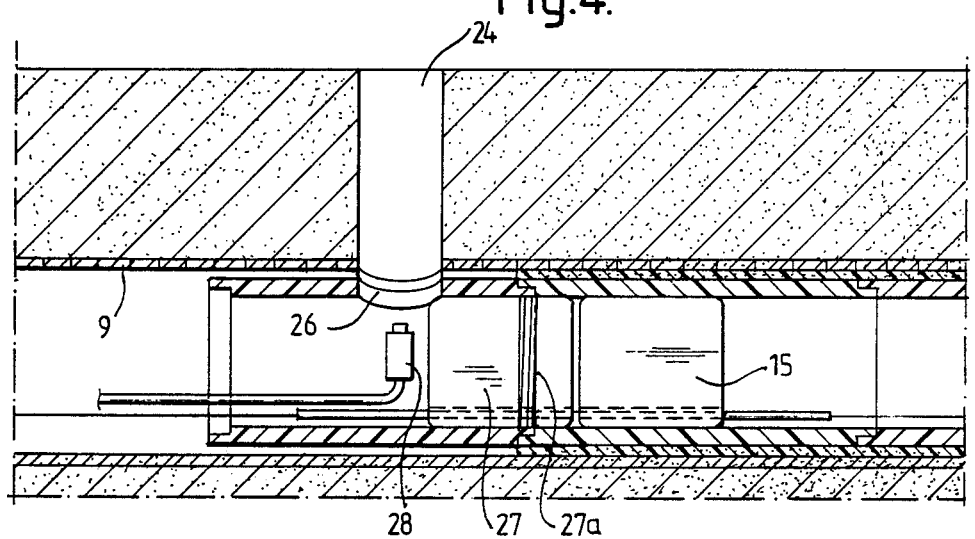
FIG. 4 is a schematic side view of a sewer with a cut pipe in position adjacent a lateral.

A piece of pipe 1 to be placed in a sewer has a spigot end 2 and a socket end 3, the socket end 3 carries within it a strip of electrically conductive material 4.

Before placing the pipe within the sewer a bag 5 is inserted into the pipe 1. The bag 5 carries an inductive coil 6 which is positioned directly adjacent the spigot end 2 of the pipe. The bag is then inflated to fix it into position. The pipe 1 also includes the grouting pump 7 which is attached to the nipple 8 of the pipe 1 through which the grout is pumped outside the pipe.

The pipe 1 enters through the sewer 9 by a man-hole 10 and is pulled through the sewer 9 by a cable 11 which is attached to a winch 12. The pipe 1 is pulled up the sewer until the coil 6 of the bag 5 is in line with the electrically conductive strip 13 on the last fixed pipe 14. The pipe is fixed into position since it is grouted and therefore does not vary in length due to any temperature change. When the coil 6 is in line with the strip 13 a deflection is shown on the voltmeter connected to the inductive coil showing that the pipe is in its correct position. At this point more current is supplied to coil 6 to heat strip 13 to fuse the pipe 1 to the fixed pipe 14. Strip 13 is coated with a polyethylene coating 13a. When strip 13 heats up the coating 13a expands to seal the space between the two pipes. This prevents any water in the sewer from coming into contact with strip 13 to prevent any cooling of the strip 13. Air is then pumped through the grouting pump 7 to operate the air-logic system to produce grout which passes through the nipple 8 to the area between the pipe 1 and the sewer 9. When this has been completed the grouting pump 7 is pulled out of the pipe 1 breaking the nipple 8 which forms a seal against the grouting re-entering the pipe 1. The bag 5 is then deflated and the bag is then removed from the sewer 9.

This cycle of steps is repeated until the distance between the last pipe 14 and the next approximate position of a lateral is less than the length of a pipe. At this point bag 15 and a cage 16 which both have holes 17 along their lengths are threaded onto a metal rod 18 which is attached to the cable 11 running through the sewer 9. The bag and cage are then pulled along the sewer until the cage 16 meets the end of the pipe 14. At this point the bag 15 is inflated to form a fixed reference position. The cage 16 carries a T.V. camera 19 which is movable along its length. The T.V. camera 19 also includes a rotatable mirror 20 which means that the camera can scan the whole of the sewer 9. Along the length of the cage is a graduated scale 21 which shows the longitudinal position of the camera and around its circumference there is a graduated scale 22 which shows the radial position of the mirror. The T.V. camera 19 sends signals to a viewer 23 outside the sewer. The T.V. camera 19 is drawn back along the cage until a picture of the first edge of the lateral 24 is send to the viewer 23. The mirror 20 is then rotated until an image of the scale 21 is send to the viewer 23. The position of the far side of the lateral is found in a similar way. The radial position of the mirror is measured from the scale 22 which is measured with respect to the fixed position 17.

The cage 16 is then removed from the sewer 9.

A hole 26 is then cut out of another pipe which is the correct longitudinal distance from the end of the pipe and in the correct radial position with respect to the fixed position 17 of a bag 27 which is similar to the bag 15. The bag 27 also carries a coil 27a to effect the welding. The cut pipe carries a T.V. camera 28 which is directed out of the hole 26 to check that the pipe is aligned to the lateral 29. When the pipe is in position with respect to the last pipe 14 the T.V. camera 28 senses that the hole is aligned to the lateral 24, a current is induced in the coil 27a to weld the cut pipe to the last pipe 14. The bag 27 and the T.V. camera 28 are then removed form the sewer.

The metal rod 18 carried on the cable 11 is then removed from the sewer. A auxiliary grouting bag 31 includes a hole along its circumference so that it will be in a fixed radial position with respect to the pipe 14. The auxiliary grouting bag includes an elliptical hole 32 around which is sealed a flexible shuttering bag 33. Positioned around this hole are two smaller holes 34. The cut pipe also includes two nipples 34a. To the flexible bag 33 is connected a cord 35 which is used to check that the bag is in position at the lateral. The flexible shuttering bag 33 is in its first position where it is totally enclosed within the grouting bag 33 when it is placed in the sewer. The grouting pump 7 is connected to the auxiliary grouting bag 31 and moves up the sewer with it. The auxiliary grouting bag 31 is brought up the sewer until it is in the correct longitudinal and radial position with respect to the fixed position 17.

Pressure is then applied to the grouting bag 31 and the flexible shuttering bag 33 inflates and protrudes outside the hole 32 through the hole 26 of the cut pipe and into the lateral 29 thus sealing off the pipe 24 since bag 31 is also flexible there are no gaps between the bag 31 and the pipe. In this position the holes 34 are aligned with nipples 34a. Grouting pump 7 then produces grout which passes through the auxiliary grouting bag 31 through the holes 34 and nipples 34a to seal the annulus between the cut pipe and the sewer 9. It is known that the shuttering bag is in position up the lateral 24 because the auxiliary grouting bag includes a photocell 36 which senses that the cord 35 has moved to the correct position. The shuttering bag is then deflated to its first position totally within the auxiliary grouting bag 31 and the grouting pump and auxiliary grouting bag are removed from the sewer.

The grouting pump 7 is small enough to fit in a pipe. It carries two containers 37 and 38 which hold the components of the grout. Measured quantities of each component are drawn into measuring pistons 39, 40 which are controlled by control means 41. The control means 41 is run by an air-logic system 42 which is controlled by pulses of air carried along pipe 43 from outside the sewer. The measured quantities of each component are drawn into a mixing nozzle 44 where the components are spun together rapidly to mix them thoroughly. The grout produced is fed from the pump through tube 45. In this case the grouting material is a soluble polyurethane which expands to many times its original volume so that it forms an excellent sealant. The typical components for polyurethane material are resin and isocyanate. The length of the pistons 39, 40 and thus the quantity of each unit of component may be varied according to the different components and the relative volumes required to produce the grouting material.

Preferably all the control mechanisms in this method such as the air control in the grouting pipe, the current to fuse the pipes together, and the control of the T.V. cameras and the inflation and deflation of the bags are all carried in one cable 46 which extends from the sewer to the control station on the ground surface.

I claim:

1. A method of relining a sewer from a fixed control station with a plurality of thermoplastic rigid pipe liners, comprising: passing a first pipe liner along the sewer to a predetermined starting position within the sewer, each pipe liner including at one end a spigot and at its other end a socket, the spigot of each pipe liner being adapted to slidably fit into a socket of an adjacent pipe liner, the socket including on its inner surface an electrically conductive strip extending circumferentially therearound; passing a further liner along the sewer to a jointing position wherein the spigot thereof lies within the socket of the first pipe liner with the conductive strip lying between the first pipe liner and the further pipe liner; and forming a permanent joint between the first pipe liner and the further pipe liner while in situ within the sewer by inducing a current in the conductive strip to cause fusion welding of the further pipe liner to the first pipe liner, all of said steps being controlled from said control station.

2. The method of claim 1, wherein each electrically conductive strip is coated with polyethylene, so that when a current is induced in the strip the coating expands to form a waterproof seal between the spigot of the further pipe liner and the socket of the first pipe liner so that cooling of the strip by water in the sewer is prevented.

3. The method of claim 2, wherein an induction coil is located within the further pipe liner at a position aligned with the spigot thereof, the coil being connected to a power source and a volt meter at the control station; and wherein current is passed through the coil while the pipe liner is passed along the sewer so that when the spigot of the further pipe liner is within the socket of the first pipe liner, the voltage across the coil changes and the volt meter at the control station is deflected thereby indicating that the further pipe liner is in the jointing position, the induction coil being removable from the sewer via the control station once the joint has been completed.

4. The method of claim 1, wherein after the joint between the further pipe liner and the first pipe liner has been effected, the annular space between the further pipe liner and the sewer is filled with grout, the grouting being effected and controlled at the control station.

5. The method of claim 4, wherein a grouting pump controlled at the control station is connected to a nipple in the pipe liner; wherein the grouting pump is passed along the sewer in the pipe liner; and wherein, when said pipe liner is in position, grout is passed from said grouting pump through said nipple to fill the annular space between the liner and the sewer; and wherein, after the grouting is completed, the connection between the grouting pump and the nipple is broken.

6. A method of relining a sewer having a lateral connected therewith which comprises: inserting lengths of pipe liner into the sewer; locating the approximate position of the lateral when the distance between the edge of the last pipe liner is less than the length of a length of pipe liner so that the lateral will meet the sewer at a position lined by the next pipe liner; locating the radial and longitudinal position of the lateral with respect to a reference point on the trailing edge of the last pipe lining; at the control station, cutting a hole in the next length of pipe liner in the same relative radial and longitudinal position with respect to a reference point on the leading edge of the next pipe liner; passing the next pipe liner along the sewer to the jointing position with the last pipe liner; and aligning the reference point on the next pipe liner with the reference point on the last pipe liner whereby the hole in the next pipe liner is aligned with the lateral.

7. The method of claim 6, wherein the exact radial and longitudinal position of the lateral is determined by introducing a cage into the sewer, said cage having a closed circuit television camera slidably mounted thereon, a mirror rotatably mounted thereon and graduations to mark off longitudinal and radial distances from a reference point; passing the cage along the sewer until it is adjacent to the last pipe liner; moving the camera and mirror until the camera faces the lateral, the television camera being directed to the graduations and connected to a viewing screen at the control station; and determining at the control station the radial and longitudinal positions of the lateral with respect to the graduations.

8. The method of claim 7, wherein each pipe liner is pulled through the sewer by a cable attached to a winch; wherein to aid location of the lateral a rod is attached to the winch cable and passed through the sewer until the rod becomes fixed to the edge of the lining, the cage including along its length a cylindrical slot into which the rod slides when the cage is passed along the sewer to fix the cage with respect to the rod, the next pipe liner having inserted into it an insert including a cylindrical slot, forming a reference point, the reference point of the lining, by the rod entering the cylindrical slot.

9. The method of claim 7, wherein the cut pipe liner is passed along the sewer with a closed circuit television camera facing out of the hole in the pipe liner, the camera being connected to the control station so that from the control station it may be determined when the hole is exactly aligned with the lateral before the cut pipe liner is joined to the last pipe liner.

10. The method of claim 6, wherein, when the cut pipe liner has been joined to the last pipe liner, the annulus around the pipe is grouted with the aid of an auxiliary grouting bag comprising a flexible cylindrical bag having a hole of generally elliptical shape around which is fixed a flexible shuttering bag, the shuttering bag having a collapsed position wherein the shuttering bag is totally enclosed within the cylindrical bag and an inflated position wherein the shuttering bag protrudes outwardly from the cylindrical bag; the step comprising passing the auxiliary grouting bag, while the shuttering bag is in the collapsed position, into the cut pipe liner so that the hole of the flexible cylindrical bag and the hole in the cut pipe liner are generally aligned; applying pressure from the control station to the shuttering bag to cause the shuttering bag to assume its inflated position so that it protrudes into the lateral whereby the lateral is completely sealed off so that the annulus between the cut pipe liner and the sewer may be grouted.

11. The method of claim 10, wherein it is determined if the shuttering bag is completely inflated up the lateral by means of observing the movement of a string attached to the shuttering bag with a photocell within the flexible bag, said photocell providing an indication at the control station.

12. A method of controlling the relining of a sewer from a fixed control station above the ground adjacent a first manhole, the sewer having a plurality of sewer laterals, the method comprising passing lengths of pipe liner down the first manhole and along the sewer by inserting into each pipe liner an inflatable bag, the bag when inflated gripping the sides of the pipe liner, the bag including along its length close to its edge a cylindrical slot through which a winch cable is inserted, the winch cable extending from the first manhole to a second manhole, a first length of pipe liner being passed along the sewer from the control station to a predetermined starting position, the bag within the pipe liner deflated and removed from the sewer leaving the pipe liner in position, a grouting pump for producing grout in situ being attached to a nipple in the pipe liner, the pump being controlled from the control station to produce grout and feed it through the nipple to fill the annular space between the pipe liner and the sewer, breaking the connection of the pump to the nipple and removing the pump from the sewer, subsequently repeating the steps of passing a further length of pipe liner along the sewer from the control station to a jointing position wherein the further length of pipe liner abuts the sewer lining, and forming a permanent joint between the further length of pipe liner and the lining the extend the sewer liner, the pipe liners being thermoplastic and wherein each length of pipe liner includes at one of its ends a spigot and at its other end a socket, the spigot of a a first pipe liner being a slidable fit into a socket of an adjacent pipe liner, the socket including on its inner surface an electrically conductive strip extending circumferentially around the pipe liner, and wherein each further length of pipe liner is passed along the sewer until the spigot of the further pipe liner lies within the socket of the adjacent end of the lining with the conductive strip lying between the lining and the further length of pipe liner, the joint being effected by inducing a current in the strip to cause fusion welding of the further length of pipe liner to the lining, the induction being controlled at the control station, each further length of pipe liner being passed along the sewer with an induction coil located within the pipe liner, at a position aligned with the spigot of the pipe liner, the coil beiing connected to a power source and a volt meter at the control station, current being passed through the coil while the pipe liner is passed along the sewer, so that when the spigot of the further length of pipe liner is within the socket of the lining the voltage across the coil changes, whereby the volt meter deflects to provide an indication at the control station that the further length of pipe liner is in the joint position where the joint may be effected, the induction coil being removable from the sewer to the control station once the joint has been completed, the annular space between the lining and the sewer being filled with grout using a grouting pump, the steps being repeated until the distance between the edge of the lining and the approximate position of a lateral is less than the length of a length of pipe liner such that the position lined by the next length of pipe liner is the position at which the lateral will meet the sewer, a hole then being cut into the next length of pipe liner at the exact position of the lateral by the steps of locating the radial and longitudinal position of the lateral with respect to a reference point on the edge of the sewer lining, at the control station cutting a hole in the next length of pipe liner the same radial and longitudinal position with respect to a reference point on the length of pipe liner, passing the next length of pipe liner along the sewer to the jointing position, and aligning the reference point on the length of pipe liner with the reference point on the lining whereby the hole in the pipe liner is aligned with the lateral, the cylindrical slot through which the winch cable passes forming the reference point, the cut pipe liner being passed along the sewer with a closed circuit television camera facing out of the hole, the camera being connected to the control station so that from the control station it may be checked that the hole is exactly aligned with the lateral before a joint is effected between the cut pipe liner and the lining, the annulus around the cut pipe liner then being grouted by passing an auxiliary grouting bag along the sewer to a position within the cut pipe liner, the auxiliary grouting bag comprising a first flexible cylindrical bag having a hole in its side of generally elliptical shape around which is fixed a flexible shuttering bag, the shuttering bag being capable of being in two positions, a first position wherein the shuttering bag is totally enclosed within the cylinder, the cylindrical bag being placed within the cut pipe liner with the hole of the bag and the pipe generally aligned, pressure being applied from the control station to the shuttering bag from its first position to its second position in which it protrudes out of the cylinder into the lateral whereby the lateral is completely sealed off so that the annulus between the cut pipe liner and the sewer may be grouted, the cycle of steps then being repeated until the next lateral position, all operations being effected and controlled from the control station.

* * * * *